Patented Dec. 25, 1951

2,580,364

UNITED STATES PATENT OFFICE 2,580,364

PREPARATION OF CRYSTALLINE PENICILLIN SALTS

Murray Senkus, Terre Haute, Ind., assignor to Commercial Solvents Corporation, Terre Haute, Ind., a corporation of Maryland No Drawing. Application August 3, 1946,
Serial No. 688,342

8 Claims. (Cl. 260—239.1)

This invention relates to a process for preparing pure penicillin material, and more particularly to a method for preparing such pure penicillin material in the crystalline state in the form of its salts.

I have found that pure, crystalline penicillin salts, such as ammonium penicillin, substituted ammonium penicillins, potassium penicillin, sodium penicillin, and rubidium penicillin, may be prepared directly from impure aqueous solutions thereof according to my invention by a simple salting-out process under pH conditions preferably between about 5 and 8.5 from an aqueous solution to an organic solvent, utilizing as the salting-out agent a water-soluble salt having the same cation as the desired penicillin salt, followed by concentration and crystallization, as hereinafter described, without the necessity for first preparing a dry, impure concentrate.

Among the substituted ammonium pencillins of my invention may be mentioned methylammonium penicillin, diethylammonium penicillin, trimethylammonium penicillin, choline penicillin, and benzyltrimethylammonium penicillin.

In the currently used methods for the recovery of penicillin from culture liquors in which it is produced, the liquor is variously treated to purify and concentrate it and eventually to obtain it in the form of a relatively concentrated but still impure water solution. The aqueous penicillin salt solution thus obtained is then frozen and dried from the frozen state, and this dry material is stored under refrigeration for subsequent administration upon re-solution in water.

One prior-art method for obtaining the aqueous solutions of penicillin described above involves the steps of filtering the culture liquor, adsorbing the penicillin on active carbon, eluting the penicillin with an aqueous-organic solvent mixture, evaporating the organic solvent, acidifying and extracting the aqueous penicillin-containing residue with a water-immiscible organic solvent such as amyl acetate, and then re-extracting the amyl acetate with an aqueous alkaline solution. Other methods involve extraction of the filtered culture liquors with an organic solvent, followed by multiple-step extractions, alternately into organic solvents and aqueous alkaline solutions.

In carrying out my invention, I first prepare an aqueous solution of penicillin salts according to the prior-art methods, for example, by re-extraction of the amyl acetate solution of penicillin described above with an aqueous alkaline solution, preferably the hydroxide, carbonate, or bicarbonate of the desired cation, or a buffering mixture, such as a mixture of phosphates, and preferably using such quantity of the alkaline solution as will produce a final pH within the range of about 6 to 8. I may then concentrate it by known means, as by another series of solvent extractions, or preferably by low-temperature distillation under reduced pressure, to a concentration preferably around 50,000 Oxford units of penicillin activity per milliliter. Such an intermediate concentrating step is not essential to my process, but is desirable in order to economize on the quantity of salting-out agent required.

To the aqueous penicillin salt solution thus prepared, I add a quantity of a salting-out agent of a type more fully described below and quantity of an organic solvent chosen from the groups disclosed in my copending application referred to above, and having certain characteristics that will be clearly set forth below. The pH of the mixture is then preferably adjusted, if adjustment is necessary, to the range between about 5 and 8.5. The most satisfactory pH range for efficient transfer of ammonium penicillin to the organic solvent phase is between about 6.2 and 6.5; and for the potassium salt, between about 6.8 and 7.0. The mixture is stirred until the salting-out agent dissolves, thereby driving the penicillin salt into the organic-solvent layer. The two layers are then separated, and the organic-solvent layer may be treated, if desired, with additional solvent, either the same or a different solvent of the type described, to precipitate whatever small quantities of salting-out agent may have dissolved in the organic solvent; or the organic-solvent layer may be treated with additional salt to further dehydrate it, or with active carbon to clarify and purify it. The mixture of organic solvent with salting-out agent or with active carbon is then filtered, and neutralized to a pH preferable around 7 with an acid or alkali, as required. For this purpose, phosphoric acid is an especially suitable acid; and alkaline compounds, such as the hydroxide, carbonate, and bicarbonate of the desired cation, depending on the penicillin salt being prepared, are suitable alkalizing agents. Buffering agents, such as phosphates, are also operative, but are less desirable because they tend to contaminate the product. The neutralizing agent may be added in any desired manner, for example, as an aqueous solution, or as an aqueous solution diluted with an organic solvent, or preferably as a solution in an organic solvent. It will be obvious that the use of an organic solution for the neutralization avoids the addition of water, which should preferably be removed for best results in the ensuing crystallization.

When certain salts are used as the salting-out agents, such as potassium chloride and the like, which form solutions having a pH around 7, no adjustment of pH need be made, since these solutions are already at the pH desirable for crystallization of the penicillin salt.

While I prefer to carry out the concentration and crystallization at near-neutral pH levels, I have obtained acceptable results at substantially higher and lower levels. My process is operative to some degree under conditions as acid as pH 4 and as alkaline as 8.5.

The organic-solvent solution of penicillin salt is next distilled, preferably under reduced pressure and at temperatures below about 40° C., to remove any water dissolved therein and to concentrate the solution until the concentration of penicillin salt in the residual solvent is at least as great as the concentration required to saturate the solvent at ordinary temperatures, or until crystallization begins, as evidenced by a clouding of the liquid. The actual penicillin concentration at this point will vary, depending on the type of penicillin being processed, and on the type and quantity of impurities present. Higher temperatures may be employed during the distillation step, but in such case the length of time during which the solution is exposed to such temperatures should be held to a minimum, as by use of a so-called "flash" distillation, for example, in a falling-film evaporator, in order to minimize the decomposition of penicillin.

After the solution has been dehydrated and suitably concentrated, crystals usually begin to form immediately at ordinary room temperatures. Crystallization may be hastened and rendered more nearly complete by neutralizing, if neutralization was not carried out prior to the dehydration and concentration steps, and by cooling, and to this end it is usually desirable to cool the solution down to about 5° C. and allow it to crystallize at this temperature. After crystallization, the crystals may be separated in any desired manner, for example, by filtering, washing, and drying.

Alternatively, I may choose to prepare the crystalline penicillin salts by evaporating the organic solvent substantially completely under reduced pressure at low temperatures. In this modification of my invention, I prefer to measure the organic solution accurately into serum vials, and to evaporate the solution to dryness under a pressure of about 10–40 mm. Hg and at temperatures below about 40° C.

Suitable salting-out agents for use in my process include water-soluble salts having the cation of the desired penicillin salt in combination with inorganic anions, such as sulfate, chloride, bromide, phosphate, and the like; or in combination with organic anions, such as acetate, propionate, butyrate, valerate, benzoate, citrate, tartrate, oxalate, sulfonate, and the like. Many of these salts have pH values in aqueous solution within the critical range described. In the case of those whose pH values are somewhat outside this range, the solution may be adjusted by the addition of the corresponding acid or basic component of the particular salt, so that the salting-out process is carried out within the preferred pH range referred to.

It will be understood that in order to prepare a crystalline penicillin salt containing only one of the specified group of cations, it is necessary to employ a salt for the salting-out step having the same cation as the penicillin salt that is being processed. If a salt having a different cation is used, the resulting crystalline penicillin salt will in general contain a mixture of cations. If the quantity of salting-out agent used is sufficiently great, the resulting penicillin salt will contain primarily the cation of the salting-out agent.

Solvents suitable for use in my process to effect extraction of penicillin salts from aqueous solutions and subsequent crystallization of the penicillin salts include all of the organic solvents for penicillin salts described in the copending application referred to above which are immiscible with aqueous penicillin-salt solutions in the presence of the salting-out agents described above.

Particularly adapted for my purpose is the group of organic liquids that may be described as "hydrophilic", that is, either miscible with water in the absence of my salting-out agents, or capable of dissolving at least about 3 to 5% of it. A number of classes having operative members are given in the following list: alcohols, aldehydes, ketones, acetals, cyclic acetals, ketals, cyclic ketals, cyclic ethers, hydroxy ethers, hydroxy esters, and keto esters. As specific examples of the foregoing classes of solvents may be cited ethanol, n-propyl alcohol, isopropyl alcohol, n-butyl alcohol, secondary butly alcohol, tertiary butyl alcohol, n-hexyl alcohol, capryl alcohol, n-octyl alcohol, 2-ethylhexy alcohol, diethylcarbinol, allyl alcohol, diacetone alcohol, cyclohexanol, acetone, ethyl methyl ketone, cyclohexanone, benzaldehyde, dimethyl acetal, 1,3-dioxolane, 2,2-dibutoxypropane, 2,2,4,5-tetramethyl-1,3-dioxolane, 1,4-dioxane, butyl Cellosolve, butyl lacetate, and methyl levulinate.

While the various types of solvents described are satisfactory for use in my invention, I prefer to use the alcohol solvents, both of the type strictly classified as alcohols, such as the normal alcohols, secondary alcohols, tertiary alcohols, saturated and unsaturated alcohols, straight-chain and cyclic alcohols, and the like; and also those compounds which, though not always strictly classified as alcohols, contain alcohol or hydroxyl groups, and include hydroxy esters, hydroxy ethers, and the like. Therefore, wherever the term "alcohol" is used in the claims, it should be construed to include all the alcohol-type compounds described above, as well as the compounds usually included in the term "alcohols."

Of the various alcohol solvents, I prefer to use the lower aliphatic alcohols because of their ready availability, and the high yields of crystals obtainable therefrom.

The quantity of salting-out agent used is not particularly critical, but should be sufficient to cause the preponderant proportion of penicillin salt to seek the organic solvent phase in preference to the water phase. Usually a quantity sufficient to form at least about a 25% solution of salt in the water layer will be sufficient, although larger quantities can be used if desired, and such larger quantities up to sufficient to produce a saturated solution result in forcing greater proportionate quantities of penicillin salt into the organic solvent layer. Thus in the case where n-butyl alcohol is the organic solvent and ammonium sulfate is the salt used, a 33% solution of ammonium sulfate in the water layer affords a distribution ratio of ammonium penicillin of about 150 to 1 in favor of the solvent, whereas a saturated solution results in a distribution ratio of approximately 250 to 1 in favor of the solvent.

The organic solvent should preferably be used in a volume somewhat less than the volume of the aqueous penicillin solution treated, so that a degree of concentration of penicillin salt is effected at this stage. In the case where n-butyl alcohol is used as the solvent, a solvent-to-water ratio between 1 to 5 and 1 to 10 has been found satisfactory.

For the satisfactory application of my process to the preparation of pure, crystalline sodium penicillin, I find it desirable to start with a relatively pure sodium penicillin instead of the crude material which may be used in the preparation of other salts. The yield of crystalline sodium penicillin tends to be greatly reduced by the presence of any substantial quantities of organic impurities in the solution in which the crystallization is carried out, and the effect varies somewhat, depending on the nature of the impurities. Ordinarily, however, I am able to crystallize sodium penicillin successfully from an organic solvent solution of impure sodium penicillin having a potency as low as 900 units per milligram of dissolved solid.

Prior to the crystallization step of my process, I have found it advantageous to treat the penicillin solutions at one or more of the various stages with a small proportion of an active charcoal, an active magnesium silicate, or other material of the type commonly referred to as decolorizing agents, thereby removing substantial proportions of impurities of unknown composition which tend to retard crystallization. This treatment may be carried out by slurrying the decolorizing agent with the penicillin solution and subsequently filtering and washing the filter cake with a small quantity of clean solvent.

The term "pure" as used herein to describe the crystalline penicillin salts of my invention is not used in its absolute sense to designate a material completely free from all impurities. Accordingly, wherever the term "pure" appears as relating to penicillin salts, it should be construed as designating a purity at least about 85% of the theoretical purity of the particular type of penicillin designated, measured in terms of standard units of penicillin activity per milligram of solids, as assayed against the U. S. Food and Drug Administration standard established March 25, 1944, and based on crystalline sodium penicillin G, having an arbitrarily ascribed antibiotic activity of 1650 units per milligram of solids against the organism *Staphylococcus aureus*. The standard unit referred to is an arbitrary unit established by the U. S. Food and Drug Administration. (A. C. Hunter and Wm. R. Randall, "Standardization of Assay of Penicillin," J. Assoc. of Official Agricultural Chemists, August 1944, pp. 430-438.) While this unit is not precisely the Oxford unit, it is so close to it as to be well within the experimental error of the assays used; and for lack of a precise name, this unit is more or less universally referred to as synonymous with the Oxford unit.

The following specific examples will further illustrate my invention:

*Example I*

An impure aqueous ammonium penicillin solution was prepared as follows:

To ten liters of amyl acetate solution of the acid form of penicillin assaying 10,000 Oxford units of penicillin activity per milliliter was added 1 kilogram of active carbon, the mixture was slurried and filtered, and the filter cake was washed with 2.5 liters of fresh amyl acetate. To the combined filtrate and washings was added a 0.1 normal aqueous solution of ammonium hydroxide until the pH reached 7.7. The water extract of impure aqueous ammonium penicillin solution, assaying 41,000 Oxford units of penicillin activity per milliliter, was then separated and found to measure 2165 milliliters.

To this impure aqueous ammonium penicillin solution were added 1760 grams of ammonium sulfate and 3,000 ml. of secondary butyl alcohol, and the mixture was stirred to dissolve the ammonium sulfate. The aqueous solution had a pH of 6.4. Two layers formed, and the top (secondary butyl alcohol) layer, now containing the penicillin, was separated and treated with 50 grams of ammonium sulfate and 10 grams of active carbon to clarify and purify the solution and to remove residual water. The mixture was again filtered, and the filtrate was distilled in vacuo at at 25° C. until the volume had been reduced to 700 ml. The concentrated solution was then neutralized to a pH of 7.2 with a solution containing one part of aqueous 28% ammonia and one part secondary butyl alcohol. Upon neutralization of the solution, crystals of ammonium penicillin began to form. The solution was allowed to stand overnight at 5° C. to crystallize. The crystals of pure ammonium penicillin were then separated by filtration, washed portionwise with 75 ml. of secondary butyl alcohol and then with 150 ml. of acetone, and dried in air. The crystals weighed 27.3 grams, assayed 1700 Oxford units per milligram, and represented a conversion of 46.5%.

*Example II*

To fifty liters of aqueous ammonium penicillin solution assaying 47,000 Oxford units of penicillin activity per milliliter were added 121 kilograms of ammonium sulfate and 38 liters of n-butyl alcohol. The mixture was stirred until the ammonium sulfate had dissolved, and was found to have a pH of 6.4. Two layers formed, and the upper (n-butyl alcohol) layer containing the ammonium penicillin was separated. This solution, measuring 47.3 liters, was distilled in vacuo at 25° C. until its volume had been reduced to 36 liters. Then the pH of the solution was adjusted to 7.5 with a mixture of one part aqueous 28% ammonia solution and one part secondary butyl alcohol, whereupon crystals of pure ammonium penicillin formed. These crystals were filtered immediately, washed successively with portions of secondary butyl alcohol and acetone, and dried in air. The crystals weighed 705 grams and assayed 1350 Oxford units per milligram, suggesting that they were contaminated with some ammonium sulfate. The mother liquor was allowed to stand overnight at 5° C., whereupon another crop of ammonium penicillin crystals formed, which, upon being filtered, washed as above, and dried, weighed 158 grams and assayed 1800 Oxford units per milligram. The two crops of crystals represented a conversion of over 50%.

*Example III*

To 100 ml. of impure aqueous potassium penicillin solution prepared in a manner analogous to that described in Example I and having an activity of 34,500 Oxford units per milliliter were added 30 grams of potassium chloride and 100 ml. of n-butyl alcohol, and the mixture was stirred until the salt had dissolved. The mixture had a pH of 7.0. Two layers formed and were separated. The n-butyl alcohol layer, now containing the potassium penicillin, was evaporated at a temperature of about 30° C. and a reduced pressure of 35 mm. until crystals formed. The residue was drained of liquid and placed in a refrigerator at 5° C. for about four hours, after which the crystals were dried and weighed. The crystals weighed 1.4933 grams and assayed 1510 Oxford units per milligram, corresponding to a conversion of 43%.

*Example IV*

To 100 ml. of aqueous potassium penicillin solution assaying 34,500 Oxford units per milliliter were added 75 grams of potassium acetate and 100 ml. of n-butyl alcohol. The mixture was stirred for about 10 minutes; and after complete solution of the potassium acetate, the pH was adjusted to 7.0 with acetic acid. The n-butyl alcohol layer was then separated and concentrated at 35 mm. Hg and at a temperature below 40° C. until substantially all of the water had been removed. The concentrate was then cooled, and from the resultant slurry were separated 1.181 grams of crystalline potassium penicillin assaying 1400 Oxford units per milligram, corresponding to a conversion of 48%.

*Example V*

Three liters of a butyl acetate solution of penicillin, prepared from a culture Q-176 beer, and assaying 1250 units per milliliter, were slurried with 30 g. of Darco G-60. The char was then removed by filtration and washed with 250 ml. of fresh butyl acetate. The combined filtrate and washings were extracted with aqueous ¾% sodium hydroxide solution plus sufficient water to give 400 ml. of aqueous extract. To this were added 200 g. of sodium dihydrogen orthophosphate monohydrate ($NaH_2PO_4.H_2O$), and 70 ml. of n-butyl alcohol. The mixture was stirred for ten minutes, and the n-butyl alcohol was separated, neutralized, and concentrated to cause crystallization as in Example I. This gave 0.750 g. of crystals of sodium penicillin which assayed 1627 units per milligram, corresponding to a conversion of 32.5%.

*Example VI*

The following example illustrates a modification of my invention in which a penicillin salt of one metal is converted into the crystalline penicillin salt of another metal:

A solution was prepared by adding 100 g. of sodium orthophosphate dodecahydrate

($Na_3PO_4.12H_2O$)

to 100 ml. of water, adjusting the pH to 6.0 with 20.5 ml. of concentrated orthophosphoric acid ($H_3PO_4$), and filtering. Then 3 grams of potassium penicillin, assaying 1594 units per milligram, were added, and after the mixture had been stirred between two and three minutes, 50 ml. of n-butyl alcohol were added. Stirring was continued for ten minutes. Then the n-butyl alcohol layer was separated and the pH of the alcohol solution was adjusted to 8.0 with 5.3 ml. of aqueous 0.5% sodium hydroxide solution. This gave 61 ml. of wet organic solution. Two-milliliter portions were measured into serum vials, and were dried overnight at 35 C. and 10 mm. Hg. Each of the bottles contained 0.87 g. of crystalline product, assaying 1698 units per milligram and analyzing 5.9% Na and 0.11% K, corresponding to a 94% conversion.

*Example VII*

An amyl acetate solution of penicillin measuring 3665 ml. and assaying 8200 units per milliliter was stirred for five minutes with 300 grams of Darco G-60. The slurry was then filtered, the char was washed with 1 liter of fresh amyl acetate, and the original filtrate and the wash solvent were combined. The amyl acetate solution was subsequently extracted to pH 6.8 with aqueous ammonium hydroxide, giving 410 ml. of aqueous ammonium penicillin. To the aqueous solution were then added 100 ml. n-butyl alcohol and 210 grams of ammonium sulfate. The mixture was stirred until all the salt had dissolved, and the n-butyl alcohol layer, measuring 150 ml. and containing the major proportion of the penicillin, was separated. The n-butyl alcohol solution was diluted to 220 ml. with acetone, precipitating a small quantity of ammonium sulfate, which was filtered off, and leaving 216 ml. of a solution of ammonium penicillin in n-butyl alcohol and acetone. This solution was transferred to a 300-ml. distillation flask, 10 ml. of saturated aqueous ammonium bicarbonate solution were added, and the volume of liquid was reduced to 100 ml. by distillation at low temperature and pressure. The pH of the residual solution was 5.4. The solution was stored in a refrigerator overnight, in order to promote crystallization, and the resulting crystals were subsequently filtered, washed first with 20 ml. n-butyl alcohol and then 50 ml. acetone, and subsequently dried. Crystals of ammonium penicillin weighing 6.85 grams were obtained, assaying 2360 units per milligram, corresponding to a conversion of 61%.

*Example VIII*

An amyl acetate solution of penicillin measuring 19 liters was extracted to pH 7.3 with a solution of 14 grams of ammonium bicarbonate in 970 ml. water, giving an aqueous ammonium penicillin solution measuring 970 ml. The aqueous solution was stirred for 15 minutes with 30 g. Darco G-60. The resulting slurry was filtered, the char was washed with 150 ml. fresh water, and the filtrate and wash water were combined, giving a total volume of 1070 ml. This aqueous solution was subsequently stirred with 100 ml. n-butyl alcohol and 100 g. ammonium sulfate until all of the ammonium sulfate had dissolved. The resulting n-butyl alcohol solution of ammonium penicillin was separated and diluted to 280 ml. with acetone, a small quantity of dissolved ammonium sulfate being precipitated thereby. The ammonium sulfate was filtered off, the filtrate was transferred to a distillation flask, 3.5 ml. saturated aqueous ammonium carbonate and 3.5 ml. water were added, and the solution was distilled at 16 mm. Hg to a maximum liquid temperature of 30° C., at which point crystallization began. After the crystallization had reached completion, the resulting slurry was filtered, and the crystals were washed first with 20 ml. n-butyl alcohol and then with 80 ml. acetone, and were finally dried and assayed. Crystalline ammonium penicillin weighing 5.40 grams was obtained, assaying 1600 units per milligram, corresponding to a conversion of 69%.

While the above describes the preferred embodiments of my invention, it will be understood that departures may be made therefrom within the scope of the invention as described and claimed.

This is a continuation of my application Serial

No. 614,440, filed September 4, 1945, now abandoned.

In accordance with the foregoing specification, I claim as my invention:

1. In a process for preparing pure, crystalline potassium penicillin, the steps which comprise adding a water-soluble potassium salt to an aqueous solution of penicillin salts, extracting potassium penicillin from the resulting solution at a pH between about 5 and 8.5 with an alcohol immiscible therewith, dehydrating and concentrating the resulting extract, and crystallizing substantially pure potassium penicillin therefrom.

2. In a process for preparing pure, crystalline potassium penicillin, the steps which comprise adding potassium chloride to an aqueous solution of potassium penicillin, extracting the potassium penicillin from the resulting solution at a pH between about 5 and 8.5 with n-butyl alcohol, dehydrating and concentrating the resulting extract, and crystallizing pure potassium penicillin therefrom.

3. In a process for preparing pure, crystalline ammonium penicillin, the steps which comprise adding a water-soluble ammonium salt to an aqueous solution of penicillin salts, extracting ammonium penicillin from the resulting solution at a pH between about 5 and 8.5 with an alcohol immiscible therewith, dehydrating and concentrating the resulting extract, and crystallizing substantially pure ammonium penicillin therefrom.

4. In a process for preparing pure, crystalline ammonium penicillin, the steps which comprise adding ammonium sulfate to an aqueous solution of ammonium penicillin, extracting the ammonium penicillin from the resulting solution at a pH between about 5 and 8.5 with n-butyl alcohol, dehydrating and concentrating the resulting extract, and crystallizing pure ammonium penicillin therefrom.

5. In a process for preparing pure, crystalline sodium penicillin, the steps which comprise adding a water-soluble sodium salt to an aqueous solution of penicillin salts, extracting sodium penicillin from the resulting solution at a pH between about 5 and 8.5 with an alcohol immiscible therewith, dehydrating and concentrating the resulting extract, and crystallizing substantially pure sodium penicillin therefrom.

6. In a process for preparing pure, crystalline sodium penicillin, the steps which comprise adding sodium chloride to an aqueous solution of sodium penicillin, extracting the sodium penicillin from the resulting solution at a pH between about 5 and 8.5 with n-butyl alcohol, dehydrating and concentrating the resulting extract, and crystallizing pure sodium penicillin therefrom.

7. In a process for preparing pure, crystalline salts of penicillin consisting of sodium, potassium and ammonium penicillins from aqueous culture liquor concentrates thereof, the steps which comprise adding to such a concentrate a salting-out agent selected from the group consisting of water soluble salts of sodium, potassium and ammonium, the cation of the added salt being the same as that of the penicillin salt in the culture liquid, also adding a hydrophilic organic solvent for said penicillin salts, selected from a group consisting of alcohols, glycols, acetals, ketones, aldehydes, hydroxy ethers, hydroxy esters and cyclic ethers, said solvent being immiscible with the said culture liquor concentrate in the presence of said salting-out agent, adjusting the pH of the mixture to a value within the range of from 5 to 8.5 without introducing an extraneous cation, separating from the aqueous layer thus produced the organic layer containing the salt form of penicillin and concentrating it at a temperature below about 40° C. until the solution is at least substantially saturated with the penicillin salt, and crystallizing a pure penicillin salt therefrom.

8. In a process for preparing pure, crystalline salts of penicillin consisting of sodium, potassium and ammonium penicillins from aqueous culture liquor concentrates thereof, the steps which comprise adding to such a concentrate a salting-out agent selected from the group consisting of water soluble salts of sodium, potassium and ammonium, the cation of the added salt being the same as that of the penicillin salt in the culture liquor, also adding an alcoholic solvent for said penicillin salts which is immiscible with the culture liquor concentrate in the presence of said salting-out agent, adjusting the pH of the mixture to a value within the range of from 5 to 8.5 with the use of an alkaline compound selected from the group consisting of the hydroxide, carbonate and bicarbonate of the said cation, separating from the aqueous layer thus produced the alcoholic layer containing the salt form of penicillin and concentrating it until it is substantially saturated with penicillin salt and crystallizing said salt therefrom.

MURRAY SENKUS.

REFERENCES CITED

The following references are of record in the file of this patent:

UNITED STATES PATENTS

| Number | Name | Date |
|---|---|---|
| 2,399,840 | Wachtel | May 7, 1946 |
| 2,430,946 | Pasternack | Nov. 18, 1947 |
| 2,461,949 | Wintersteiner et al. | Feb. 15, 1949 |
| 2,496,848 | Bernhart | Feb. 7, 1950 |
| 2,520,098 | Hodge | Aug. 22, 1950 |

FOREIGN PATENTS

| Number | Country | Date |
|---|---|---|
| 545,419 | Great Britain | 1942 |
| 578,590 | Great Britain | July 4, 1946 |

OTHER REFERENCES

Systematic Organic Chemistry, p. 34 (1931), Constable and Co.

Science, vol. 96, July 3, 1942, pp. 20, 21.

Nature, Oct. 7, 1944, p. 459.

Pfizer Report Summary of Purification and Chemical Studies on Penicillin up to December 24, 1943, pages 1-5.

Examination of Mother Liquors, Jan. 2, 1944, page 2.